March 2, 1954     H. C. R. CARLSON     2,670,628
APPARATUS FOR TESTING SPRINGS
Filed May 28, 1952
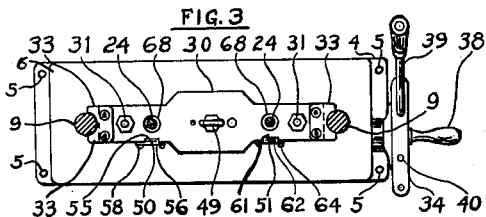
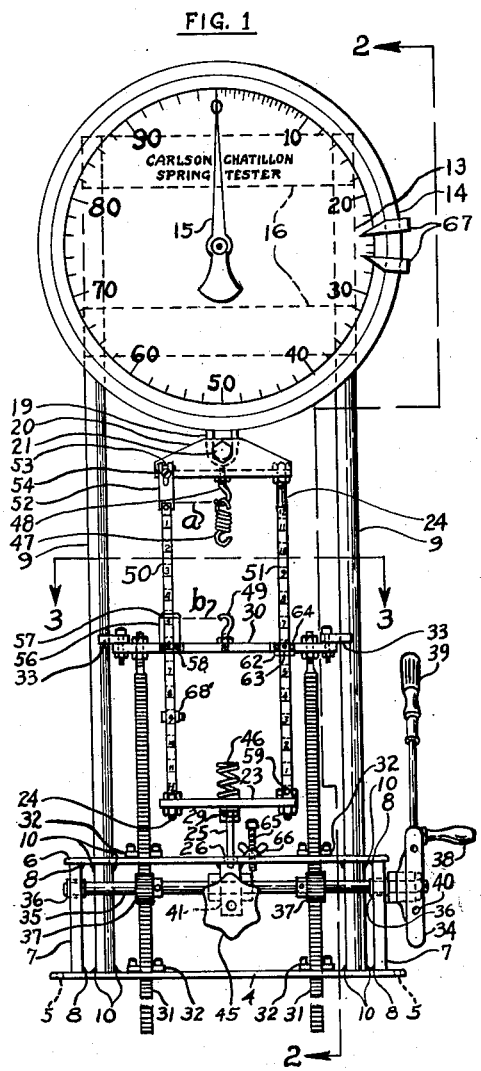
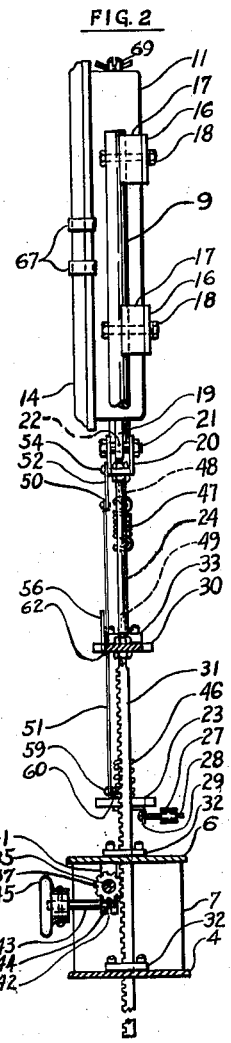
INVENTOR.
BY *Harold C. R. Carlson*
*John A. Seifert*
Attorney Patented Mar. 2, 1954

2,670,628

UNITED STATES PATENT OFFICE 2,670,628

APPARATUS FOR TESTING SPRINGS

Harold C. R. Carlson, Brooklyn, N. Y.

Application May 28, 1952, Serial No. 290,477

12 Claims. (Cl. 73—161)

This invention relates to apparatus for testing or checking the loads and deflections of compression and extension springs.

It is an object of the present invention to produce a spring tester which is readily mounted on a bench.

It is another object of the invention to produce a ruggedly constructed spring tester at low cost.

It is another object of the invention to produce a spring tester which is easily operated by a single hand-wheel thereby increasing the rate of testing springs.

It is a further object of the invention to produce a spring tester which is readily adjusted for different sizes of compression and extension springs.

It is still a further object of the invention to provide stops to test springs at exact length, at definite deflection or to a specific load.

Other objects and advantages of the invention will be set forth in the detailed description of the invention.

In the drawing accompanying and forming a part of this application,

Figure 1 is a front elevational view of the apparatus for testing compression and extension springs.

Figure 2 is a side elevational view of the apparatus partly in section taken on the line 2—2 of Figure 1 looking in the direction of the arrows.

Figure 3 is a cross-sectional view taken on the line 3—3 of Figure 1 looking in the direction of the arrows.

The embodiment of the invention as illustrated in the accompanying drawing comprises a base including a bottom horizontal plate 4 having openings 5 for securing the base to a bench, not shown. A top horizontal plate 6 of less length than the bottom horizontal plate 4 is supported in spaced parallel relation above the bottom horizontal plate 4 by a pair of vertical end plates 7. Each of the end plates 7 is secured to the horizontal plates 4 and 6 by suitable means, such as welding as shown at 8 in Figure 1.

The base 4—8 supports a pair of spaced uprights 9 of circular shape in cross-section having the lower ends abutting the bottom plate 4 and passing through the top plate 6. The uprights are secured to the horizontal base plates 4 and 6 by welding 10, as shown in Figure 1.

The uprights 9 support an indicating mechanism including an open side casing 11, as shown in Figure 2, enclosing and supporting the operative parts, not shown, a dial having graduations, such as denoting pounds, as shown at 13 in Figure 1, and secured in the open side of the casing by bezel 14. A pointer 15 is adjustably connected to the operative parts of the indicating mechanism and moves in a circular path over the dial 13 relative to the graduations thereon, as shown in Figure 1. The casing 11 is secured to the upper end portions of the uprights 9 by transverse members 16 secured at intermediate portions to the closed side of the casing 11 and the ends spaced from the uprights 9 by spacers 17 and secured to the uprights 9 by bolts 18, as shown in Figure 2. The operative parts of the indicating mechanism are provided with a link 19 of loop shape suspended from the lower portion of the casing 11 midway between the uprights 9.

A transverse bar 20 of channel shape is connected to the loop of the link 19 by a bolt 21 having in the center an annular groove 22 to engage the loop of the link 19 and the opposite end portions secured in aligned openings in the side walls of the channel of the bar 20, as shown in Figure 2.

A platform 23 is connected to and suspended from the transverse bar 20 by a pair of spaced rods 24 secured at the opposite ends in the end portions of the bottom wall of the channel of the bar 20 and in the end portions of the platform 23. The platform 23 is provided with a centering pin 25 secured to and extended from the bottom of said platform and positioned in an opening 26 in the center of the top horizontal plate 6 of the base to prevent lateral movement of the platform 23. To maintain the platform 23 in level position, a balance-weight 27 is screwed on a screw-threaded shank 28 supported at one end by an angle-bracket 29 adjustably connected to the bottom of the platform 23 so that the shank extends in parallel spaced relation to the platform 23, as shown in Figure 2.

A second platform 30 is movably supported between the transverse bar 20 and the first platform 23 by a pair of spaced racks 31 extended through aligned openings in the horizontal plates 4 and 6 and guided in said openings by U-shaped guides 32 secured to the horizontal plates 4 and 6. The bench upon which the apparatus is mounted is also provided with openings for the vertical travel of the racks 31. The platform 30 is guided between the uprights 9 by guides 33 secured at one end to the opposite end portions of the platform 30 and having arcuate recesses in the opposite ends to slidably engage the uprights 9, as shown in Figure 3. The second platform 30 is arranged with spaced openings 68 for accommodating the rods 24.

Vertical movement is imparted to the second platform 30 by a hand-wheel 34 secured on an end portion of a shaft 35 rotatably mounted in bearings 36 in the vertical end plates 7 of the base. A pair of pinions 37 are secured on the shaft 35 to mesh with the racks 31 and reciprocate the racks by the rotation of the shaft 35. When light springs are tested, the hand-wheel 34 is actuated by a crank-handle 38 secured to and extended laterally from the rim of the hand-wheel. When heavy springs are tested, the hand-wheel 34 is actuated by a lever 39 removably fitted in one of a series of equidistantly spaced openings 40 in the rim of the hand-wheel 34. The shaft 35 is releasably retained against rotation by a clamp 41 secured at one end to the underface of the base plate 6 and having a circular opening to accommodate an intermediate portion of the shaft 35 and of a diameter to permit free rotation of said shaft. The diameter of said clamp opening is adapted to be reduced by a slot 42 extending from the free end of the clamp to said opening and said slot is constricted by a shank 43 having one end portion reduced and screwed in one wall portion of the slot, as shown at 44 in Figure 2. The opposite end portion of the shank 43 is provided with a hand-wheel 45 positioned beyond the front of the base, as shown in Figure 2. The turning of the hand-wheel 45 in the proper direction restricts the slot 42 and tightens the clamp 41 around the shaft 35 and retains the shaft 35 against rotation. The shaft 35 is held against rotation when it is desired to retain the second platform 30 in fixed position.

In testing a compression spring, said spring is positioned on the first platform 23, as indicated at 46, and the second platform 30 is moved by the hand-wheel 34 toward the first platform 23 until the spring 46 is compressed to the desired degree as described hereinafter.

In testing an extension spring 47, one end of said spring is engaged on a hook 48 removably mounted in the center of the bottom wall of the channel of the transverse bar 20. The opposite end of the spring 47 is engaged on a hook 49 removably mounted in the center of the second platform 30. The second end of the spring 47 is engaged with the hook 49 by moving the second platform by the hand-wheel 34 toward the transverse bar 20 to a position where the second end of the spring 47 is readily attached to the hook 49. The spring 47 is tested by moving the second platform 30 from the transverse bar 20 until the spring is expanded to the desired length as more fully described hereinafter.

The springs are tested by readings on the dial 13 of the indicating mechanism and a pair of rules 50 and 51 movable as a unit with the transverse bar 20 and the first platform 23. The rules are graduated consecutively from one end to the other end in suitable measurements of length, such as inches. Rule 50 is mounted at the end at which the graduations commence by attaching said end to one end of a link 52 having the other end arranged with a slot 53, as shown in Figure 1, for the adjustable engagement of a screw 54 threaded in an end portion of the front side wall of the channel of the transverse bar 20. The link 52 is adjusted on the transverse bar 20 so that the end of the rule 50 is in horizontal alignment with the inner curve of the hook 48, as indicated by the dotted line $a$ in Figure 1. The opposite end of the rule 50 terminates above the first platform 23. The rule 50 extends in vertical alignment with the left hand rod 24 looking at Figures 1 and 3. The left hand also extends in a vertical recess 55 in the front edge of the second platform 30, as shown in Figure 3, and relative to a marker 56 of plate form and transparent material having a scribe-line 57 adjacent one end, as shown in Figure 1, and the opposite end portion adjustably mounted on the front edge of the second platform, as shown at 58, with the marker spanning the rule 50 and the recess 55. The marker 56 is adjusted on the second platform 30 so that the scribe-line 57 is in horizontal alignment with the inner curve of the hook 49, as indicated by the dotted line $b$ in Figure 1.

The rule 51 is removably attached at the end at which the graduations thereof commence to the first platform 23 by a screw 59 threaded in an angle-bracket 60 secured to the first platform, as shown in Figure 2, with said end of the rule 51 flush with or abutting the top of the first platform 23. The opposite end of the rule 51 terminates below the transverse bar 20. The rule 51 also extends in a vertical recess 61 in the front edge of the second platform 30, as shown in Figure 3, and relative to a marker 62 of plate form and transparent material having a scribe-line 63 adjacent one end and the opposite end adjustably attached, as at 64, to the front edge of the second platform 30, so that the scribe-line 63 is flush with the bottom of the second platform 30 and the marker spanning the rule 51 and recess 61. The rule 51 will also extend in vertical alignment with the right hand rod 24 looking at Figures 1 and 3.

To check or test the load at an exact or desired compressed length of a compression spring 46, said spring is placed on the first platform 23. Then the pointer 15 of the indicating mechanism is adjusted to zero by an adjusting knob 69 shown in Figure 2 or the weight of the spring is deducted, and finally the hand-wheel 34 is rotated to move the platform 30 toward the first platform 23 until the scribe-line 63 registers with the desired length graduation on the rule 51. The load of the spring will be indicated on the dial 13 by the pointer 15.

To check the length at an exact or desired load of a compression spring 46, the hand-wheel 34 is rotated to move the second platform 30 toward the first platform 23 until the pointer 15 registers with the desired load graduation on the dial 13. The length of the spring at the desired load will be the length graduation on the rule 51 in register with the scribe-line 63.

To check the length at an exact or desired load of a plurality of similar compression springs at a rapid rate, there is provided a stop 65 having a screw-threaded shank adjustably mounted in the top plate 6 of the base and retained in adjusted position by a locking device in the form of a wing-nut 66, as shown in Figure 1. In operation, the stop 65 is adjusted to abut the first platform 23 when the pointer 15 is in register with the desired load graduation on the dial 13, so that it is not necessary to look at the indicating mechanism but simply read the length graduation on the rule 51 in register with the scribe-line 63.

For testing very short compression springs, a one-half inch block, not shown, is placed between said short spring and the first platform 23 to prevent the second platform 30 from striking the nuts securing the rods 24 to the first platform. The thickness of the block is deducted when reading the rule 51.

For testing compression springs 10½ inches to 12 inches long, the hooks 48 and 49 are removed from the transverse bar 20 and the second platform 30, respectively, to permit the second platform to move closer to the transverse bar.

To check or test the load at an exact or desired length of an extension spring 47, one end of said spring is engaged on the hook 48. Then the pointer 15 is adjusted to zero by the adjusting knob 69 or the weight of the spring is deducted. Then the other end of the spring is engaged on the hook 49. Subsequently the handwheel 34 is rotated until the scribe-line 57 registers with the desired length graduation on the rule 50. The load of the spring 47 at the desired length will be indicated on the dial 13 by the pointer 15.

To check or test the length of the extension spring 47 at an exact or desired load, the spring 47 is engaged on the hooks 48 and 49 and the pointer is adjusted to zero as heretofore described. Then the hand-wheel 34 is rotated to move the second platform 30 from the transverse bar 20 until the pointer 15 registers with the desired load graduation on the dial 13. The length of the spring 47 at the exact or desired load is the length graduation on the rule 50 in register with the scribe-line 57.

The stop 65 is also used in checking the length of a plurality of similar extension springs in the same manner as hereinbefore described in connection with the compression springs.

To check the load at an exact length of a plurality of similar compression or extension springs at a rapid rate, there is provided a stop 68' adjustably mounted on a vertical rod 24 at a desired distance between the first platform 23 and the second platform 30, as shown in Figure 1. In operation, the stop 68 is adjusted to abut the second platform 30 when the desired length on the rule 50 or 51 registers with the scribe-line 57 or 63 and the load of the spring at the desired length will be indicated on the dial 13 by the pointer 15.

To test the initial tension of springs, first extend the spring any length, such as ½ inch, and note the first load indicated by the pointer 15 on the dial 13, which might for example indicate 9 pounds, and then extend the spring exactly the same length, such as ½ inch, and note the second load indicated by the pointer on the dial 13, which might for example indicate 14 pounds. The difference in these two load readings subtracted from the first load reading is the initial tension, which in the present illustration is 4 pounds (14—9=5 and 9—5=4).

To test the rate or pounds per inch or gradient, deflect the spring any convenient distance and note the first load reading on the dial 13, and then deflect the spring any second convenient distance and note the second load reading on the dial 13. The difference in the two load readings divided by the second deflection distance is the rate. For example, the first load reading is 9 pounds and the second load reading is 14 pounds and the second deflection distance is ½ inch, the rate is 5 divided by ½ and equals 10 pounds per inch.

A pair of tolerance markers 67 of magnetic material are slidably mounted on the bezel 14 and are retained in adjusted position by the magnetic force of the markers.

Having thus described my invention, I claim:

1. In apparatus for testing springs, a pair of spaced uprights, mechanism for indicating spring loads supported at the upper end portions of the uprights and having a link suspended between the uprights, a platform suspended from the link of the indicating mechanism and positioned between the lower portions of the uprights, a second platform movably mounted between and guided by the uprights and extended transversely between the indicating mechanism and the first platform, and means mounted at the lower end portions of the uprights below the first platform and operatively connected to and supporting the second platform and adapted to move said second platform vertically toward and away from the first platform and the link of the indicating mechanism to test compression springs between the platforms and extension springs between the second platform and the link of the indicating mechanism.

2. In apparatus for testing springs as claimed in claim 1, a pair of spaced rules positioned in the space between the link of the indicating mechanism and the first platform, one rule being connected to the link and the other rule connected to the first platform whereby the rules are movable as a unit with said link and first platform, and a marker adjustably mounted on the second platform and extended transversely of each rule to indicate the length of the spring under test.

3. Apparatus for testing springs as claimed in claim 2, wherein the rule connected to the link is arranged with graduations reading consecutively from the top to the bottom to indicate the length of extension springs and the rule connected to the first platform being arranged with graduations reading consecutively from the bottom to the top to indicate the length of compression springs.

4. In apparatus for testing springs, a pair of spaced uprights, mechanism for indicating spring loads supported at the upper end portions of the uprights and having a link suspended between the uprights, a transverse bar connected at the center to the link of the indicating mechanism, a platform suspended from the transverse bar and positioned between the lower end portions of the uprights, a second platform movably mounted between and guided by the uprights, and means operatively connected to and supporting the second platform and adapted to move said platform vertically toward and away from the first platform and the transverse bar to test compression springs between the platforms and extension springs between the second platform and the transverse bar.

5. In apparatus for testing springs as claimed in claim 4, a pair of hooks for the engagement of the opposite ends of an extension spring being tested, one of said hooks removably mounted on the transverse bar, and the other hook removably mounted on the second platform in vertical alignment below the hook on the transverse bar.

6. Apparatus for testing springs as claimed in claim 4, wherein the first platform is suspended from the transverse bar by a pair of rods, each rod connected at the opposite ends to an end portion of the transverse bar and the first platform and an intermediate portion of the rod extended through the second platform.

7. In apparatus for testing springs as claimed in claim 4, a rule adjustably connected at one end to the transverse bar with the opposite end terminating above the first platform to indicate the length of extension springs, a second rule secured at one end to the first platform with the opposite end terminating below the transverse bar to indicate the length of compression springs, and a marker secured to the second platform and extended transversely of each rule.

8. In apparatus for testing springs as claimed in claim 4, a pair of hooks for the engagement of the opposite ends of an extension spring being tested, one hook removably mounted on the transverse bar and the other hook removably mounted on the second platform, a link adjustably mounted at one end on the transverse bar, a rule connected at one end to the opposite end of the link with said end of the rule in horizontal alignment with the inner curve of the hook mounted on the transverse bar, and a marker adjustably mounted on the second platform and extended transversely of the rule and having a scribe-line in horizontal alignment with the inner curve of the hook mounted on the second platform.

9. In apparatus for testing springs as claimed in claim 4, a base plate extended transversely of the uprights above the lower ends of said uprights and having an opening in the center thereof, and a centering pin secured to the first platform and extended through the opening in the base plate.

10. In apparatus for testing springs as claimed in claim 4, a base comprising a pair of spaced horizontal plates adapted to support the uprights and a pair of vertical plates secured at the opposite end portions to the horizontal plates and spanning the space between said horizontal plates, a clamp secured to the top horizontal base plate and extended into the space between the horizontal base plates, and the means to move the second platform comprising a shaft rotatably mounted in the vertical base plates and extended through the clamp, a pair of pinions secured on the shaft in spaced relation to each other, a rack secured at one end to the second platform and extended through the horizontal base plates and meshing with each of the pinions, and a hand-wheel connected to the clamp to tighten the clamp around the shaft and retain the shaft against rotation.

11. In apparatus for testing springs as claimed in claim 4, a shank secured to the first platform and extending in parallel spaced relation to said platform, and a weight adjustable on the shank to balance the first platform.

12. Apparatus for testing springs as claimed in claim 4, wherein the indicating mechanism includes a circular dial arranged with graduations, and a pair of tolerance markers of magnetic material slidably supported on the peripheral portion of the dial.

HAROLD C. R. CARLSON.

References Cited in the file of this patent

UNITED STATES PATENTS

| Number | Name | Date |
|---|---|---|
| 1,763,400 | Lewis | June 10, 1930 |
| 1,874,780 | McGuckin | Aug. 30, 1932 |
| 1,908,412 | Domina | May 9, 1933 |
| 2,049,644 | Essen | Aug. 4, 1936 |
| 2,164,453 | Gaskins | July 4, 1939 |
| 2,396,700 | Holcomb | Mar. 19, 1946 |